(12) United States Patent
Kowalick

(10) Patent No.: US 10,949,553 B1
(45) Date of Patent: Mar. 16, 2021

(54) SYSTEM FOR AND METHODS OF SECURING VEHICLE ELECTRONIC DATA

(71) Applicant: Airmika Inc., Southern Pines, NC (US)

(72) Inventor: Thomas M Kowalick, Southern Pines, NC (US)

(73) Assignee: Airmika Inc., Southern Pines, NC (US)

( * ) Notice: Subject to any disclaimer, the term of this patent is extended or adjusted under 35 U.S.C. 154(b) by 0 days.

(21) Appl. No.: 16/887,803

(22) Filed: May 29, 2020

Related U.S. Application Data

(60) Provisional application No. 62/895,014, filed on Sep. 3, 2019.

(51) Int. Cl.
```
G06F 21/60      (2013.01)
G07C 5/00       (2006.01)
G06F 21/62      (2013.01)
G07C 5/08       (2006.01)
G06F 21/31      (2013.01)
```

(52) U.S. Cl.
CPC ........ *G06F 21/606* (2013.01); *G06F 21/6245* (2013.01); *G07C 5/008* (2013.01); *G07C 5/085* (2013.01); *G06F 21/31* (2013.01)

(58) Field of Classification Search
CPC .... G06F 21/606; G06F 21/6245; G06F 21/31; G07C 5/085; G07C 5/008
See application file for complete search history.

(56) References Cited

U.S. PATENT DOCUMENTS

```
7,553,173  B2   6/2009   Kowalick
8,311,858  B2  11/2012   Everett et al.
8,768,565  B2   7/2014   Jefferies et al.
8,818,614  B1   8/2014   Lekutai
9,008,896  B2   4/2015   Wanami
9,165,131  B1  10/2015   Kowalick
```
(Continued)

OTHER PUBLICATIONS

Kowalick, Thomas, The National Technology Transfer Advancement Act(NTTAA), Institute of Electrical and Electronics Engineers (IEEE) EDR Global Standards and 49 CFR 563; Issue: NHTSA's 'Blind-Spot': Balancing Technology Foresight Uncertainties and Consumer Protection in RIN 2127-AK86: Mandatory EDR Requirements, Nov. 9, 2012.

(Continued)

*Primary Examiner* — Khoi V Le
(74) *Attorney, Agent, or Firm* — Williams Mullen; Douglas C. Tsao

(57) ABSTRACT

A system for and methods of securing vehicle electronic data is disclosed. For example, a vehicle data protection system for and methods of securing access to a vehicle's event data recorder (EDR) data are provided. In one embodiment, the method comprises scanning a label having a near field communication (NFC) tag using an NFC reader device, and then displaying on the NFC reader one or more vehicle data items associated with a vehicle profile. The vehicle data items may be stored and accessed from a cloud database, and may include any useful vehicle and/or vehicle owner information. The method may further include installing or granting permission for a service provider to install a vehicle connector lockout apparatus onto a diagnostic link connector of a vehicle, and establishing a chain of custody link for EDR data via an NFC tag on the vehicle connector lockout apparatus.

16 Claims, 10 Drawing Sheets

(56) References Cited

U.S. PATENT DOCUMENTS

| | | |
|---|---|---|
| 9,424,608 B2 | 8/2016 | Greenberg et al. |
| 9,544,853 B1 | 1/2017 | Gu et al. |
| 10,430,886 B1 | 10/2019 | Brandmaier et al. |
| 2012/0136529 A1 | 5/2012 | Curtis et al. |
| 2012/0254960 A1* | 10/2012 | Lortz .................. H04L 63/104 |
| | | 726/7 |
| 2014/0142783 A1* | 5/2014 | Grimm .................. H04W 4/48 |
| | | 701/2 |
| 2015/0006023 A1 | 1/2015 | Fuchs |
| 2015/0051789 A1 | 2/2015 | Wanami |
| 2015/0112542 A1 | 4/2015 | Fuglewicz |
| 2015/0112543 A1 | 4/2015 | Binion et al. |
| 2016/0098864 A1* | 4/2016 | Nawrocki ............ H04B 5/0025 |
| | | 705/13 |
| 2016/0343178 A1* | 11/2016 | Lesesky ........... G06K 19/07764 |
| 2020/0184579 A1* | 6/2020 | Nitzschke ............... G07F 9/002 |

OTHER PUBLICATIONS

AN12196, NXP Semiconductors; NTAG 424 DNA and NTAG 424 DNA TagTamper features and hints, Rev. 1.5--30, Application note, 507215, Jul. 30, 2019.

U.S Department of Transportation, National Highway Traffic Safety Administration; Memorandum RE: Meeting with IEEE on EDR Rulemaking, Nov. 5, 2015.

IEEE Publishes Guide to Its Traffic Incident Communication Standard, World's First Motor Vehicle 'Black Box' Standard Created at IEEE, http://standards.ieee.org/announcements/pr_1616.html, Dec. 11, 2004.

IEEE 1616a-2010, Our policy towards the use of cookies, https://www.techstreet.com/standards/ieee01616a-2010?product_id=1739346, May 27, 2020.

\* cited by examiner

SYSTEM FOR AND METHODS OF SECURING VEHICLE ELECTRONIC DATA

CROSS-REFERENCE TO RELATED APPLICATIONS

The presently disclosed subject matter claims priority to U.S. Provisional Patent App. No. 62/895,014, entitled "Methods of Securing Vehicle Electronic Data," filed on Sep. 3, 2019 and is related to U.S. Pat. No. 7,553,173, entitled "Vehicle connector lockout apparatus and method of using same," issued on Jun. 30, 2009; and U.S. Pat. No. 9,165,131, entitled "Vehicle connector lockout for in-vehicle diagnostic link connector (DLC) interface port," issued on Oct. 20, 2015; the entire disclosures of which are incorporated herein by reference.

TECHNICAL FIELD

The presently disclosed subject matter relates generally to vehicle security and more particularly to a system for and methods of securing vehicle electronic data.

BACKGROUND

The vehicle DLC (OBD-II) is regulated by the Code of Federal Regulations (CFR) 40 CFR 86.094-17(h) and revisions for subsequent model years. It is standardized by the Society of Automotive Engineers (SAE) Vehicle Electrical Engineering Systems Diagnostic Standards Committee. The physical configuration of the output plug is specified under SAE J1962-2002 and thru the International Standards Organization (ISO) under ISO 15031-3-2004 and is increasingly used as an access point to other in-vehicle electronics systems, subsystems, computers, sensors, actuators and an array of electronic control modules (ECU) including air bag sensing diagnostic modules (SDM). The onboard DLC is also used as a serial port to retrieve data elements from on-board systems, subsystems, modules, devices and functions that collect and store data elements related to a vehicle crash such as a restraint control module (RCM) and an event data recorder (EDR) as per 49 CFR 563: Event Data Recorders.

An EDR is a device or function in a vehicle that records a vehicle's dynamic, time-series data just prior to or during a crash, intended for retrieval after the crash. The National Highway Traffic Safety Administration (NHTSA) is responsible for general EDR regulatory oversight and requires the installation of EDR in vehicles to provide an accurate and unbiased understanding of a crash event. The IEEE1616™ standard established in 2004 specifies minimal performance characteristics for onboard tamper- and crash-proof memory devices for various types and classes of vehicles (the 1616 standards and revisions of which are available at https:// standards.ieee.org/ and incorporated herein by reference in its entirety).

According to the Driver Privacy Act of 2015, when the vehicle owner purchases or leases the vehicle they are considered owners of the Event Data Recorder (EDR) data that the vehicle generates and stores. However, the DLC port is so unsecure that the FBI issued a public service announcement (available at https://www.ic3.gov/media/2016/160317.aspx and incorporated herein by reference in its entirety).

The IEEE 1616™ was amended in 2010 to add information pertaining to motor vehicle event data recorder connector lockout apparatuses. The amendment defines a lockout protocol for EDR output data accessibility by securing the DLC. This standard does not prescribe data security within the vehicle electronic control units (ECUs) or within the intra-vehicle communication and/or diagnostic networks but instead defines ways and means to permit uniform, but controlled access of electronic scan tools to the DLC for legitimate vehicle emissions status, maintenance and/or repair. This standard also defines a means of maintaining data security on the vehicle via a motor vehicle DLC connector lockout apparatus (MVEDRCLA). The MVEDRCLA is applicable to vehicles and their respective event data recorders for all types of motor vehicles licensed to operate on public highways.

The Department of Homeland Security's US-CERT tasked the CERT Coordination Center (CERT/CC) at Carnegie Mellon University's Software Engineering Institute (SEI) to study OBD devices to better understand the cybersecurity impact to consumers and the public. The CERT/CC analyzed a representative sample of these devices for vulnerabilities and found widespread failure to apply basic security principles. If these devices are compromised, the potential impact includes loss of privacy, vehicle performance degradation or failure, and potential injury. The goal of CERT/CC's research was to better inform consumers, enterprise fleet managers, insurance companies, and policy makers about the potential risks of these devices.

The NHTSA estimates that 91.6% of modern vehicles include EDRs. When the Haddon Matrix is applied to crashes it cites pre-crash, crash and post-crash. The crash mode is generally the crash site. The 'window of opportunity' to misuse EDR date is from the time of the crash until the time that the data is downloaded by a trusted entity of the Court, such as law enforcement.

Additionally, the CERT/CC report notes, "In enterprise IT environments, the majority of attackers are assumed to be remote, attacking the systems over the Internet. A specific automobile would be difficult to identify on the Internet, if it is directly accessible at all. Attackers are also likely to use computer security vulnerabilities as enablers of other, more physical crimes. Therefore, the threat actors are likely to be local to a targeted vehicle, generally within Wi-Fi or Bluetooth range. This doesn't rule out remote attacks, as a compromised mobile device with Internet connectivity could be connected to the car via an OBD-II device, USB, Bluetooth, or Wi-Fi. A secondary risk of using these devices is that compromise of the manufacturer or operator's back-end server may allow an attacker to access any device connecting to its network. When a consumer decides to plug one of these devices into their car, they are unintentionally moving the security boundary from the vehicle itself to the device manufacturer's network, associated services, and any other connected device."

Aftermarket OBD-II devices have the potential to introduce serious safety and security risks to an automobile. The design of the OBD-II port means that such a device has unlimited access to some or all of a car's internal networks. These OBD-II devices also have some sort of external interface that is accessible from outside of the car—typically Wi-Fi, Bluetooth, or cellular.

Thus, there remains a need to secure a vehicle's EDR data from cybersecurity attacks, particularly before, during and after a crash event, while at the same time providing a chain of custody of the vehicle's EDR data.

In some states, EDR data is not protected by the Fourth Amendment and may be obtained without a warrant. See *Mobley v. State,* 346 Ga.App. 641 (2018). Thus, Applicant also desires a system and method for installing a device to prevent unauthorized access to the EDR data or provide permission for others to install the device after a crash event.

SUMMARY

The present invention provides a cybersecurity service and NFC-enabled cybersecurity device for protecting EDR data during the biggest threat of theft (i.e., during the 'window of opportunity'), which is from the time of the crash until the EDR data is downloaded by an entity at the crash site or while the vehicle is impounded prior to expert analysis. More particularly, the cybersecurity device may comprise an AES-128 bit encrypted, tamper-proof NFC label that, when embedded directly into the AUTOCYB® vehicle connector lock attached to the OBD2 port, vehicle owners and authorized service providers can determine a chain-of-custody in real-time; for example, using an NFC reader such as smartphone with a mobile app.

In one embodiment, the NFC chip within the cybersecurity device contains an NFC Data Exchange Format (NDEF)-encoded message with government-grade cryptography. When scanned, the NFC chip is validated through a cloud service guaranteeing the authenticity of the lock status. The NFC labels provide a perfect solution for online roadside cybersecurity using NFC.

The widespread use of the present invention will reduce litigation regarding use and misuse of motor vehicle crash data. If the motorist, or law enforcement, or first responders including EMT or EMS or a tow-truck driver secures the vehicle's OBD2 port at the crash site then many current legal issues would be mute. A tow truck (also called a wrecker, a breakdown truck, recovery vehicle or a breakdown lorry) is a truck used to move disabled, improperly parked, impounded, or otherwise indisposed motor vehicles. This may involve recovering a vehicle damaged in an accident, returning one to a drivable surface in a mishap or inclement weather, or towing or transporting one via flatbed to a repair shop or other location. It is estimated that there are 20,000 tow-a-ways every day in America.

An aspect of this invention is directed to a means for securing access to a vehicle's unsecure electronic network via a locking device specifically securing access to the vehicle's on-board Diagnostic Link Connector (DLC) port that is typically used to download crash data. The device includes Near Field Communication (NFC) technology capable of communicating with the Internet to establish proof of presence thus creating a post-crash consumer protection service to establish the integrity, security, and chain of custody of EDR data.

Another aspect is directed to placing a Near Field Communication (NFC) embedded label on the driver's side sun visor of light-duty vehicles that provides, in simple and understandable language, information about the device/service and a signed statement from the vehicle owner granting permission to secure access to the vehicle's diagnostic link connector.

The present invention seeks to reduce risks associated with electronic-intensive vehicles, potential impacts of misuse of the vehicle DLC (OBD-II) port, and network attacks to a vehicle. It is an aim of the present invention to safeguard a vehicle from a variety of threats, including securing the data inside the vehicle communication buses. It is an objective to protect millions of vehicle owners and/or lessee's against specific predictable risk exposures related to a vehicle's unsecure Diagnostic Link Connector (DLC) port.

It is another object to safeguard against misuse of the vehicle's unsecure DLC by others to achieve any of the following potential safety-critical risks including: 1) driver distractions (volume, wipers, etc.), 2) engine shutoff or degradation, and 3) steering changes (in drive-by-wire vehicles).

Another object is to safeguard against less safety-critical risks, some of which are fairly unique to vehicles: 1) theft of the car or its contents, 2) enabling physical crimes against the occupants, 3) insurance or lease fraud, 4) eavesdropping on the occupants, 5) theft of information (e.g., phone list), 6) vector for attacking mobile devices in the car, 7) theft of personally identifiable information (PII), and 8) tracking the vehicle's location.

Another object is to safeguard against a secondary risk of using OBD2 dongles that compromise the manufacturer or operator's back-end server and may allow an attacker to access any device connecting to its network. When a consumer decides to plug one of these devices into their car, they are unintentionally moving the security boundary from the vehicle itself to the device manufacturer's network, associated services, and any other connected device. Vulnerabilities that this invention safeguards against include 1) insecure firmware updates and downloads, 2) hardcoded or non-existent Bluetooth PINs, 3) weak WPA2 passwords, 4) hardcoded credentials and 5) an Internet-enabled administrative interface.

Another further object is to safeguard against the following attacks: 1) arbitrarily modifying firmware, 2) maliciously updating remote firmware, 3) locking/unlocking doors 4) turning on/off vehicle, 5) affecting vehicle GPS tracking as well as speed, heading, and altitude, 6) reading the car's internal data: temperatures, fuel levels, diagnostic trouble codes, etc. and 7) injecting arbitrary CAN packets.

Various other objects, advantages and features of the present invention will become readily apparent from the ensuing detailed description and the novel features which will be particularly pointed out in the appended claims.

BRIEF DESCRIPTION OF DRAWINGS

Figure 1:
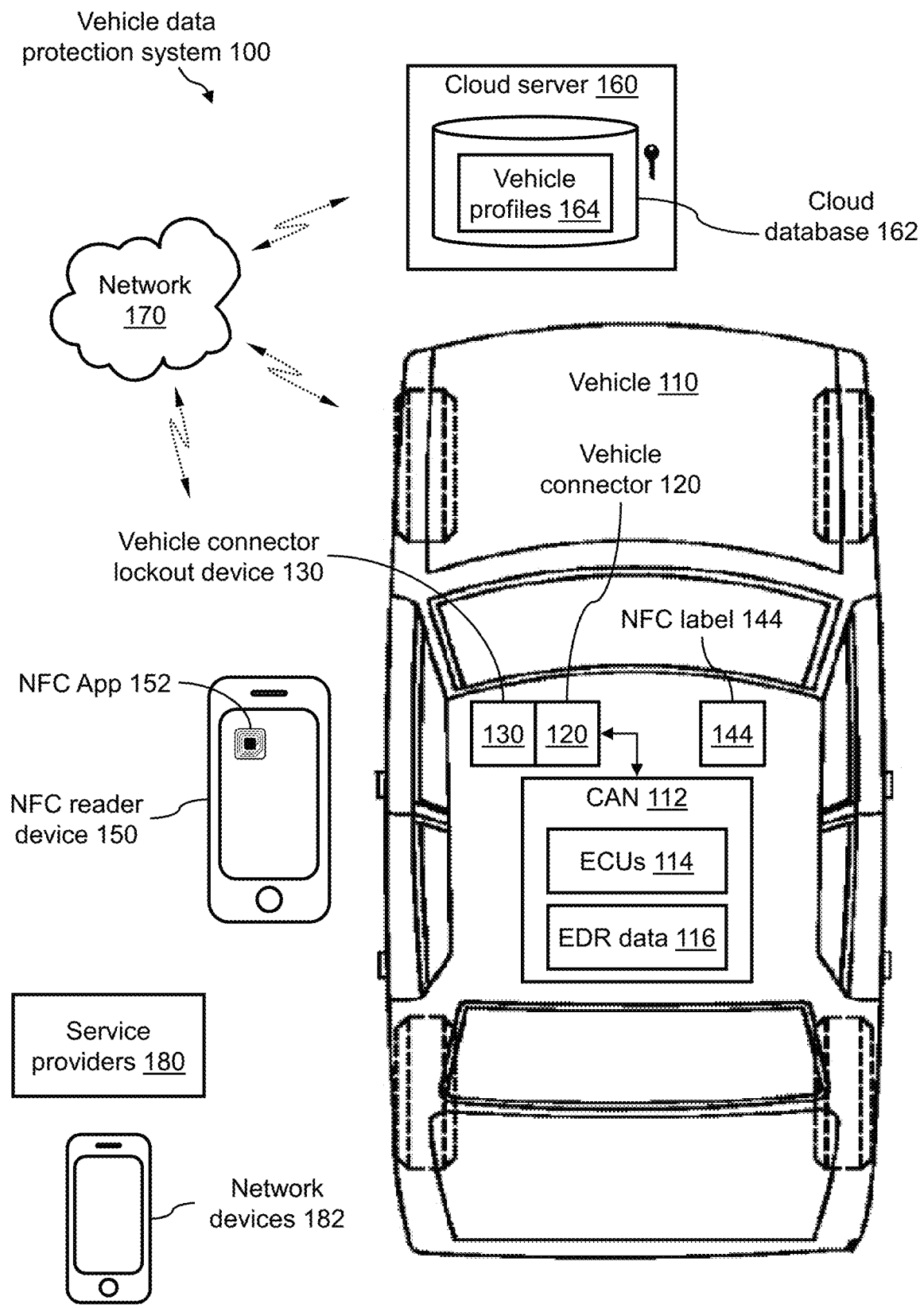
Figure 2:
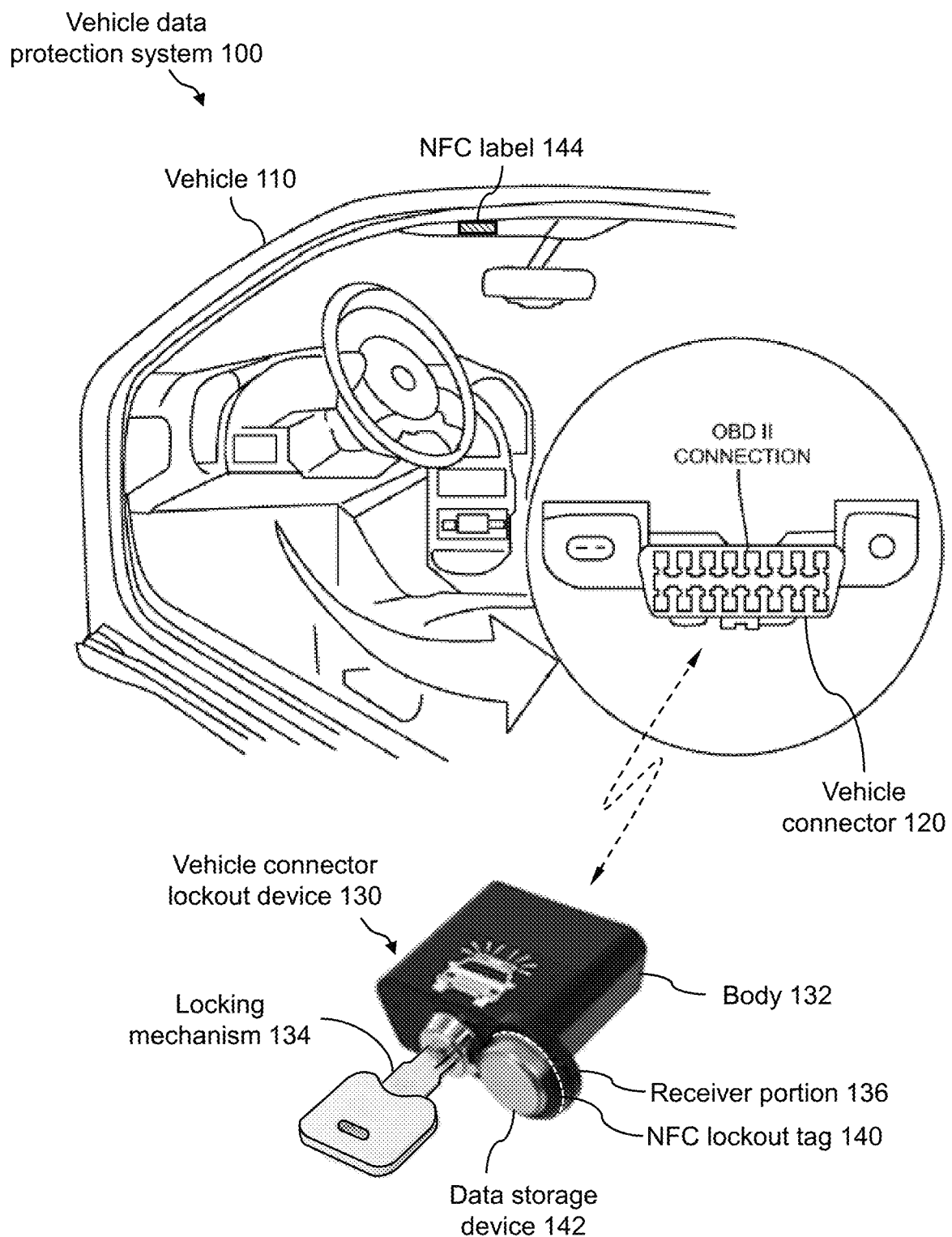
Figure 3A:
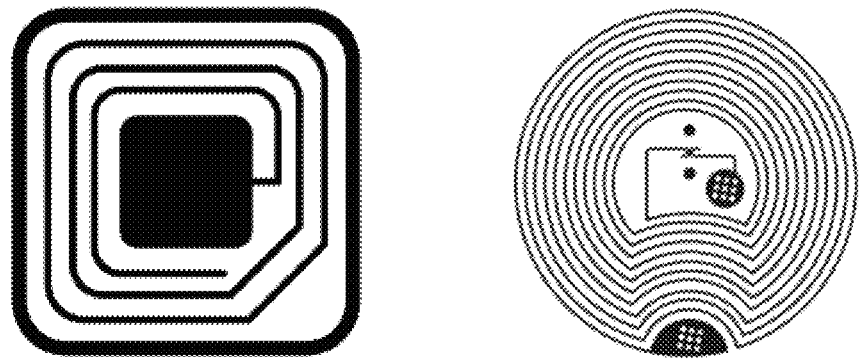
Figure 3B:
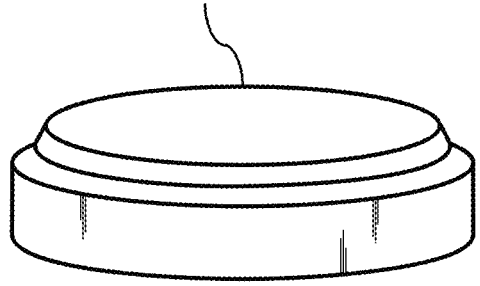
Figure 4:
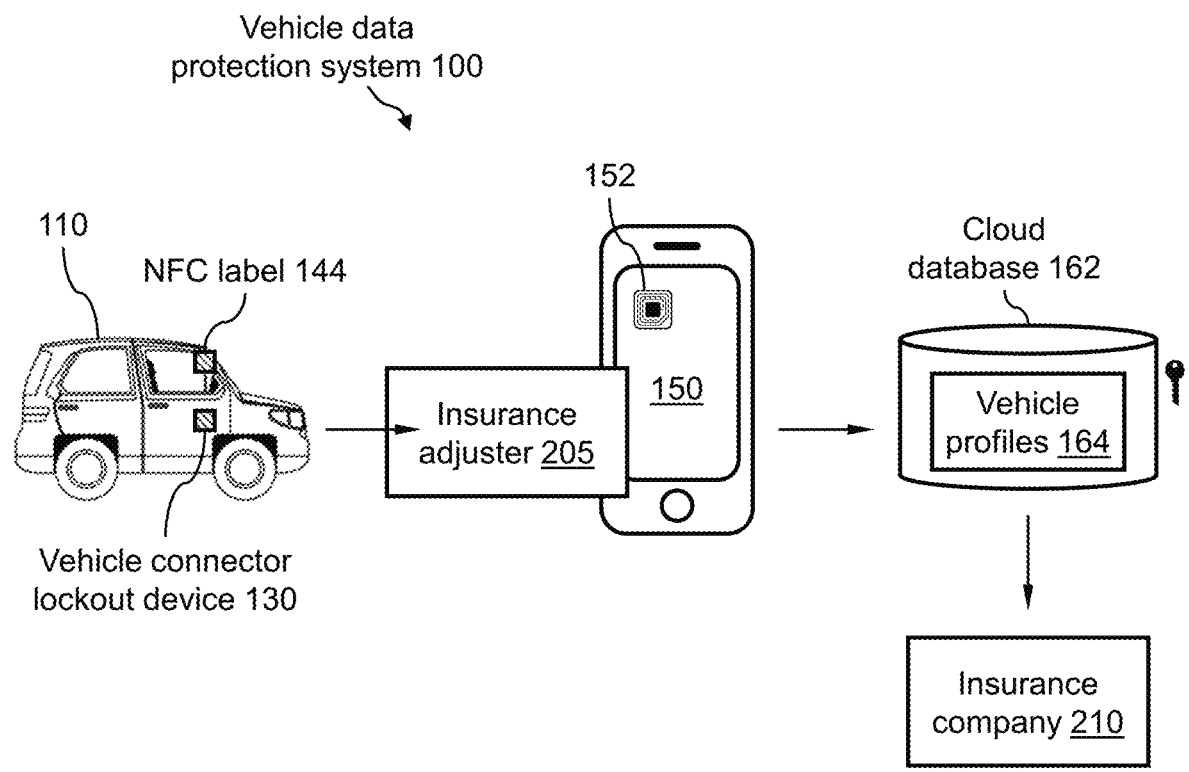
Figure 5:
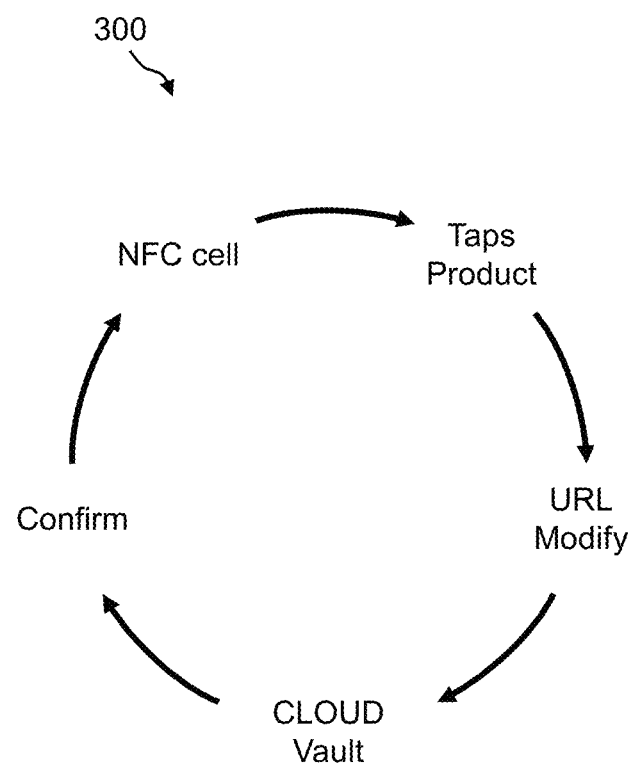
Figure 6:
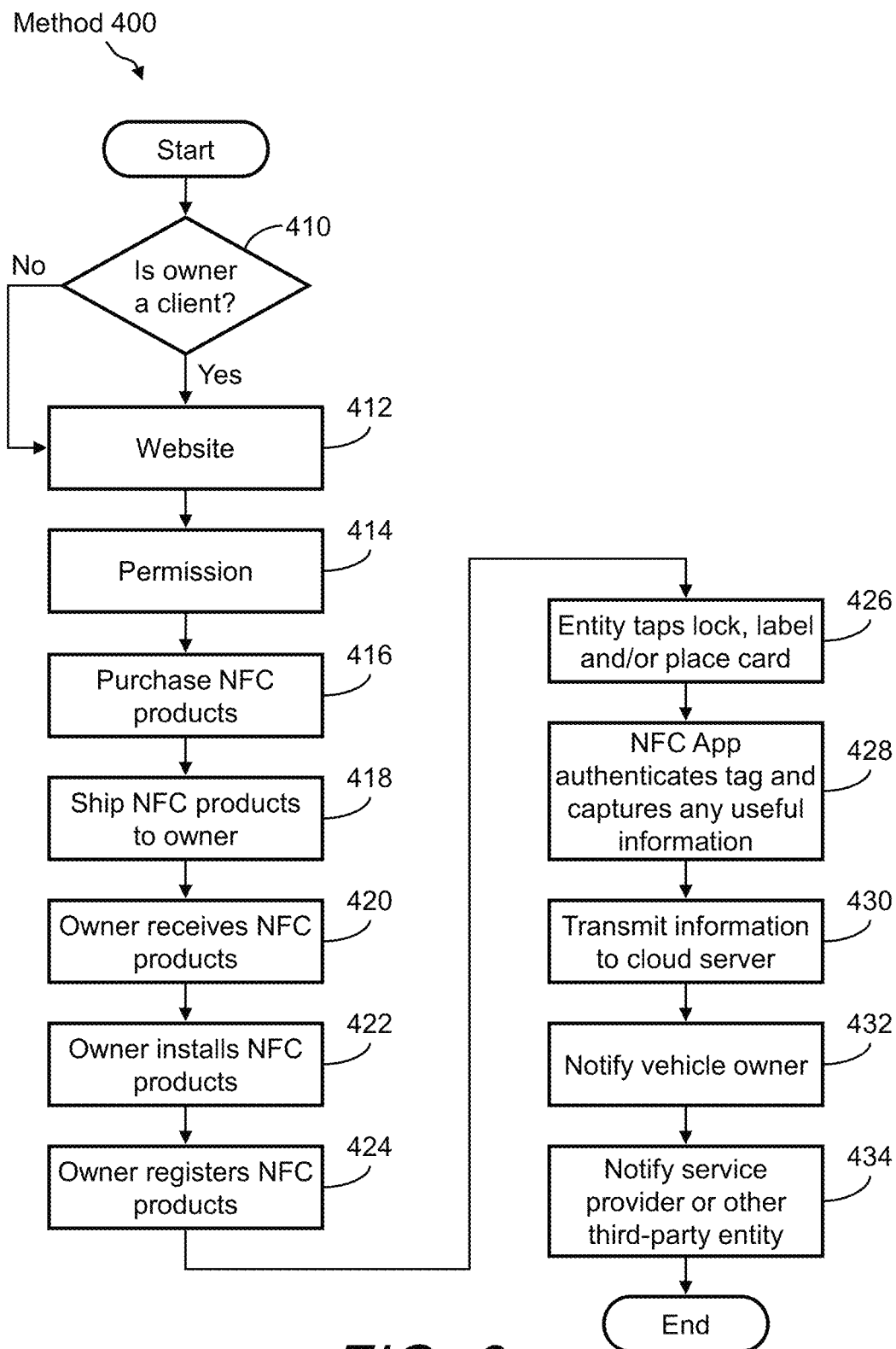
Figure 7:
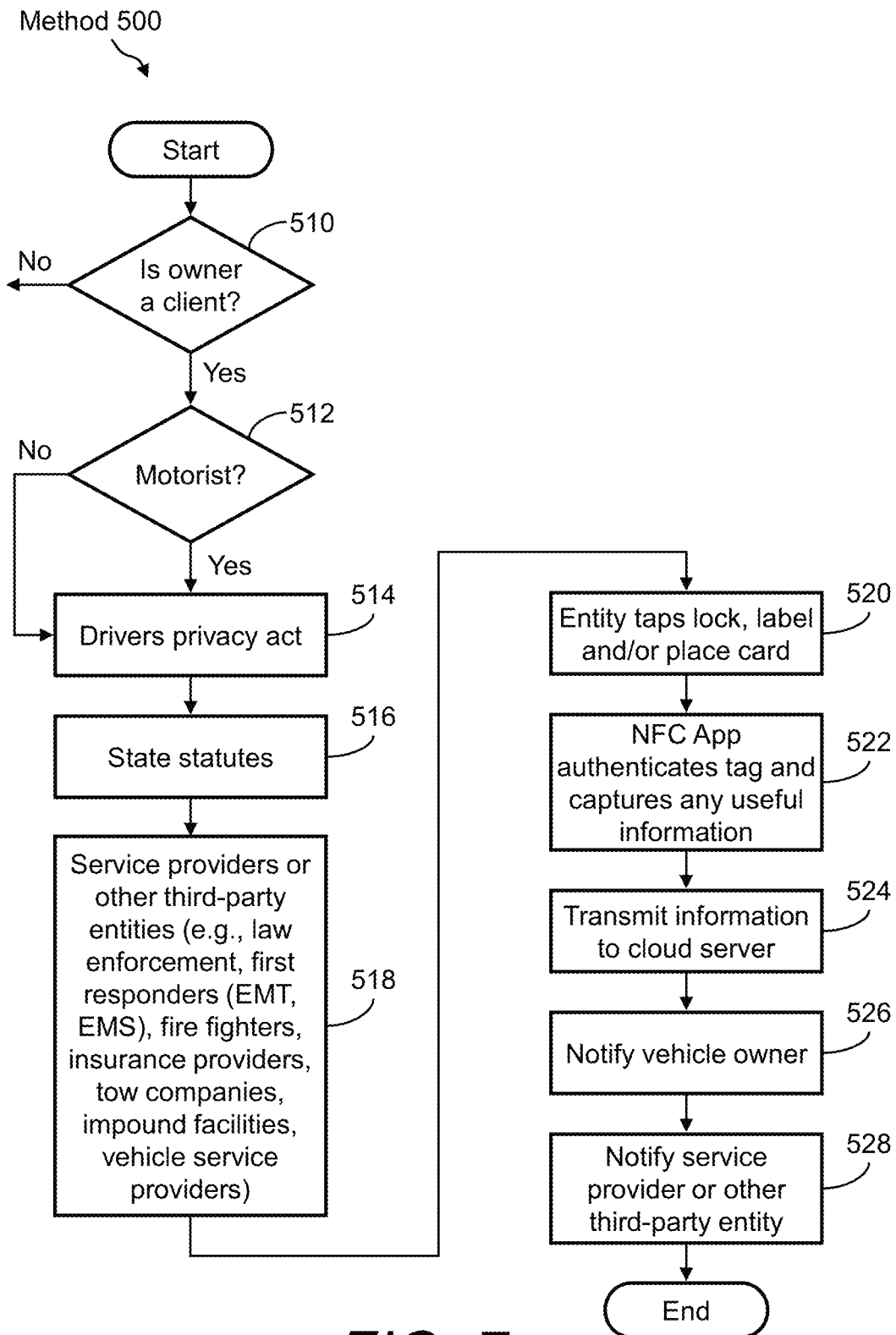
Figure 8:
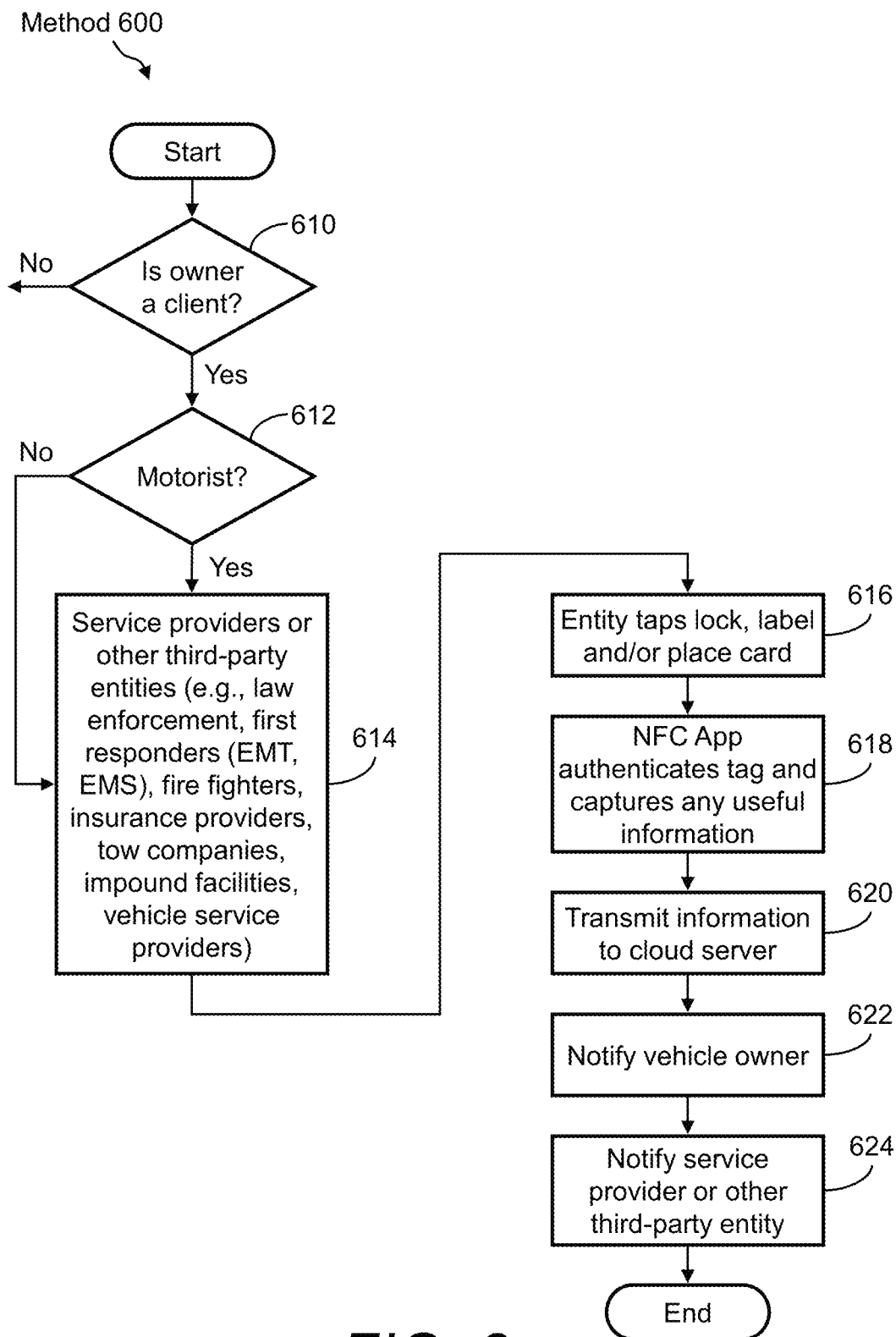
Figure 9:
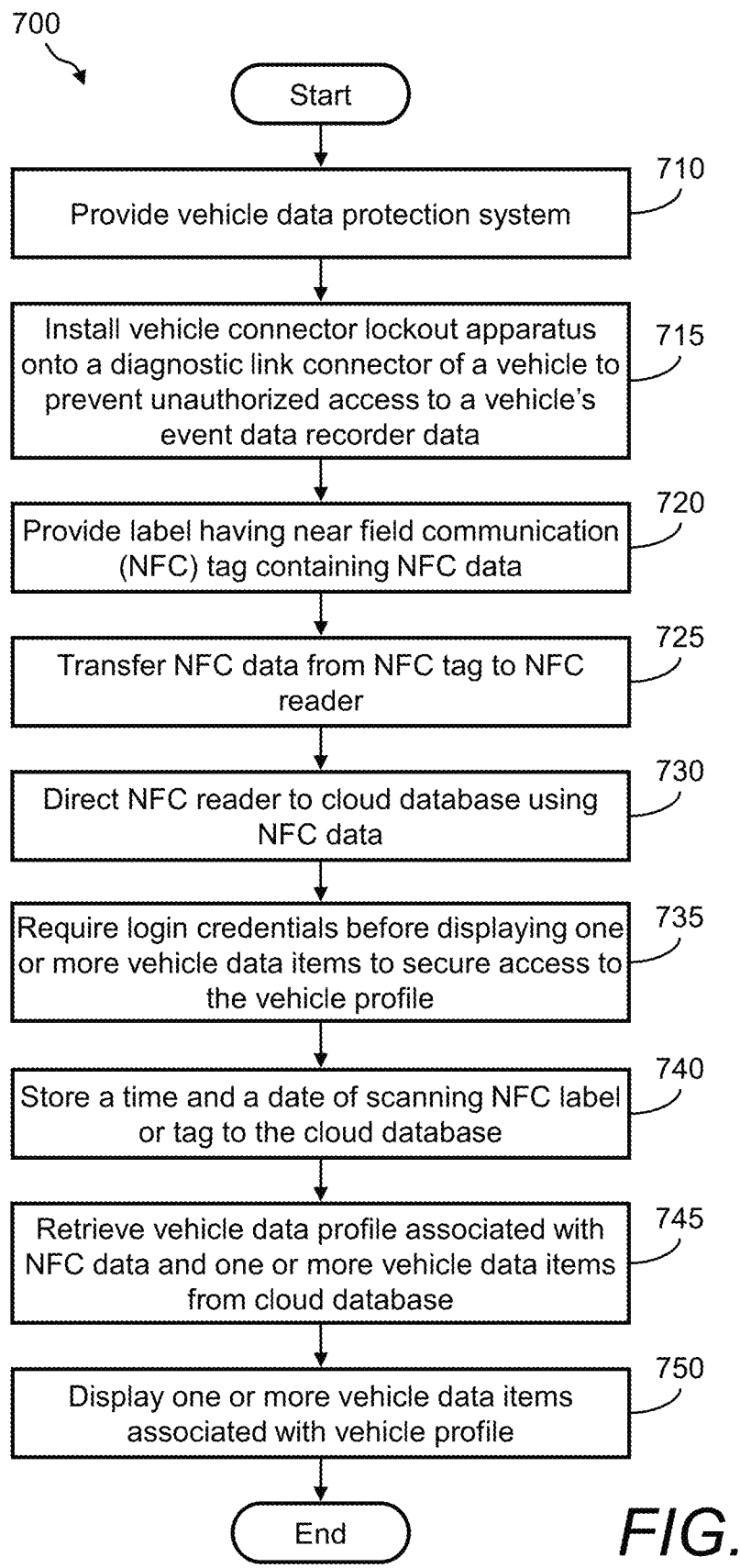
Figure 10:
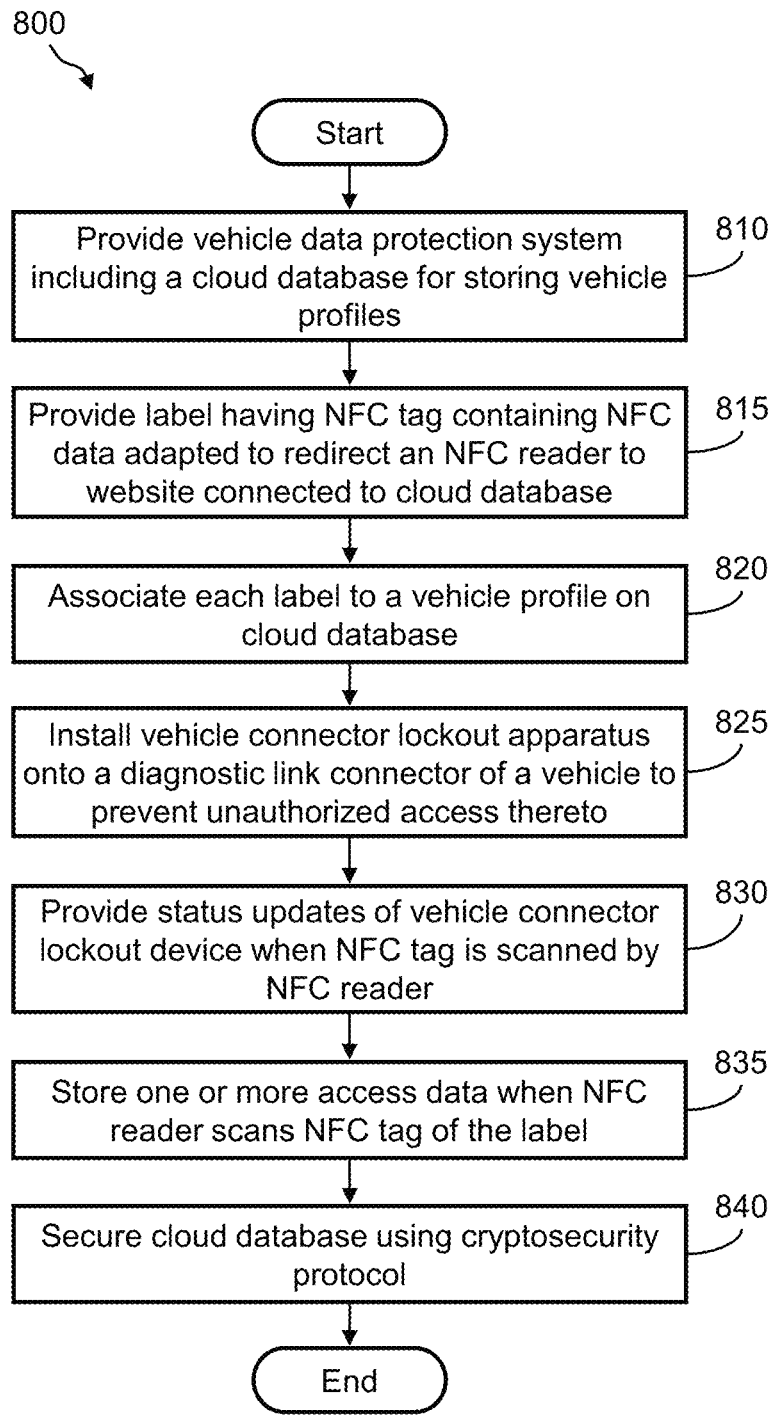

Having thus described the presently disclosed subject matter in general terms, reference will now be made to the accompanying drawings, which are not necessarily drawn to scale, and wherein:

FIG. 1 illustrates a block diagram of an example of the presently disclosed vehicle data protection system for securing vehicle electronic data and establishing a chain of custody for the data;

FIG. 2 illustrates an example of the position of a vehicle connector within a vehicle and a vehicle connector lockout device of the presently disclosed vehicle data protection system;

FIG. 3A illustrates plan views of examples NFC technology that may be used in the presently disclosed vehicle data protection system;

FIG. 3B illustrates a perspective view of an example of data storage of the vehicle connector lockout device of the presently disclosed vehicle data protection system;

FIG. 4 illustrates a schematic diagram of an example of a method of securing a vehicle's vehicle connector and accessing a vehicle profile using NFC technology installed within a vehicle according to one embodiment;

FIG. 5 illustrates a schematic diagram of an example of an NFC cycle within the presently disclosed vehicle data protection system;

FIG. 6 illustrates a flow diagram of an example of a method of securing a vehicle's EDR data before a crash event using the presently disclosed vehicle data protection system;

FIG. 7 illustrates a flow diagram of an example of a method of securing a vehicle's EDR data during a crash event using the presently disclosed vehicle data protection system;

FIG. 8 illustrates a flow diagram of an example of a method of securing a vehicle's EDR data after a crash event using the presently disclosed vehicle data protection system;

FIG. 9 illustrates a flow diagram of an example of a method of securing access to a vehicle's EDR data using the presently disclosed vehicle data protection system; and FIG. 10 illustrates a flow diagram of an example of a method of securing access to a vehicle's EDR data and establishing a chain of custody of the vehicle's EDR data using the presently disclosed vehicle data protection system.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a system for and methods of securing vehicle electronic data. For example, a vehicle data protection system and methods are provided for (1) protecting vehicle digital (or electronic) data, such as event data recorder (EDR) data of a vehicle before, during, and after a crash event, and (2) establishing a chain of custody for vehicle digital (or electronic) data, such as the EDR data.

In some embodiments, the presently disclosed vehicle data protection system and methods include a vehicle that has a control system (e.g., Controlled Area Network (CAN)) and multiple and various types of electronic control units (ECUs) and multiple and various types of sensors and wherein the control system manages and/or generates certain vehicle digital data, such as, but not limited to, EDR data.

In some embodiments, the presently disclosed vehicle data protection system and methods include a vehicle connector (e.g., in-vehicle diagnostic link connector (DLC) interface port) that may be used to access vehicle digital data, such as, but not limited to, EDR data, of the vehicle control system.

In some embodiments, the presently disclosed vehicle data protection system and methods include a vehicle connector lockout device that may installed on the vehicle connector and wherein the vehicle connector lockout device may include a locking mechanism, near field communication (NFC) technology, and data storage capability. Further, other NFC technology may be provided in the vehicle, such as, but not limited to, an NFC tag on the vehicle sun visor and/or an NFC card in the glove compartment.

In some embodiments, the presently disclosed vehicle data protection system and methods include an NFC reader device (e.g., any NFC-enabled smart device, such as, but not limited to, a mobile phone (or smartphone), tablet device, smart watch, and the like) that may be used for reading or scanning the information stored in the NFC technology of the vehicle.

In some embodiments, the presently disclosed vehicle data protection system and methods include a cloud server having a cloud database for storing vehicle profiles and wherein the cloud server, cloud database, and/or vehicle profiles may be accessed over a network by any network devices, including an NFC reader device.

In some embodiments, the presently disclosed vehicle data protection system and methods include scanning a label having an NFC tag using an NFC reader device, and then displaying on the NFC reader device one or more vehicle data items associated with a vehicle profile. The vehicle data items may be stored and accessed from a cloud database, and may include any useful vehicle and/or vehicle owner information, including but not limited to a vehicle identification number, a license plate data, a vehicle registration data, insurance data, an image, a vehicle owner's medical data, a vehicle owner's next-of-kin data, and an emergency contact data.

In some embodiments, the presently disclosed vehicle data protection system and methods include installing or granting permission for a service provider to install a NFC enabled vehicle connector lockout apparatus onto a diagnostic link connector of a vehicle, and establishing a chain of custody link for vehicle digital data, such as EDR data, via an NFC tag on the vehicle connector lockout device.

Further, a method of securing a vehicle's EDR data before a crash event using the presently disclosed vehicle data protection system is provided.

Further, a method of securing a vehicle's EDR data during a crash event using the presently disclosed vehicle data protection system is provided.

Further, a method of securing a vehicle's EDR data after a crash event using the presently disclosed vehicle data protection system is provided.

Further, a method of securing access to a vehicle's EDR data using the presently disclosed vehicle data protection system is provided.

Further, a method of securing access to a vehicle's EDR data and establishing a chain of custody of the vehicle's EDR data using the presently disclosed vehicle data protection system is provided.

Referring now to FIG. 1 is a block diagram of an example of the presently disclosed vehicle data protection system 100 for securing vehicle electronic data and establishing a chain of custody for the data. Vehicle data protection system 100 may include a vehicle 110 having a control system, such as a Controlled Area Network (CAN) 112. CAN 112 may include, for example, multiple and various types of electronic control units (ECUs) 114 and multiple and various types of sensors (not shown). Types of ECUs 114 may include, for are not limited to, an engine control module (ECM), a powertrain control module (PCM), a transmission control module (TCM), a brake control module (BCM or EBCM), a central control module (CCM), a central timing module (CTM), a general electronic module (GEM), a body control module (BCM), a suspension control module (SCM), a control unit or control module, an event data recorder (EDR), and the like.

A CANbus network allows digital data from all the ECUs 114 and sensors to be exchanged within vehicle 110. In one example, CAN 112 of vehicle 110 generates and stores EDR data 116. EDRs are devices installed in motor vehicles to record technical vehicle and occupant information for a brief period before, during, and after a triggering event, typically a crash or near-crash event. EDR data 116 may be referred to as "black-box" data, these data or event records can be valuable when analyzing and reconstructing an accident.

Digital data (e.g., EDR data 116) stored using CAN 112 may be accessed via a vehicle connector 120 of vehicle 110. Vehicle connector 120 may be a standard in-vehicle diagnostic link connector (DLC) interface port found in vehicles. Vehicle connector 120 may be, for example, a standard on-board diagnostics (OBD) connector, such as an OBD-II connector that may be accessed via an OBD-II device (e.g., a handheld OBD scanner device). More details of an example of vehicle connector 120 are shown hereinbelow with reference to FIG. 2.

The presently disclosed vehicle data protection system 100 provides certain data protection mechanisms in vehicle 110. In one example, a vehicle connector lockout device 130 is provided for securing vehicle connector 120 of vehicle 110. Vehicle connector lockout device 130 is designed to be physically connected and locked to vehicle connector 120 in a manner that blocks access to vehicle connector 120 via an OBD-II device (not shown). For example, FIG. 2 shows an example of the position of vehicle connector 120 within vehicle 110 and an example of vehicle connector lockout device 130 of the presently disclosed vehicle data protection system 100.

In one example, vehicle connector lockout device 130 includes a body 132 that is designed to mate to vehicle connector 120. A locking mechanism 134, such as a key lock, is installed in body 132 and wherein locking mechanism 134 engages with features of vehicle connector 120 to either prevent or allow access thereto. Further, body 132 of vehicle connector lockout device 130 may include a receiver portion 136 for holding certain near field communication (NFC) technology, such as an NFC lockout tag 140. The receiver portion 136 may also hold a data storage device 142.

NFC lockout tag 140 may include, for example, an NFC inlay, token, or tag as shown in FIG. 3A. Data storage device 142 may be a non-volatile microchip memory component that may be used to store, for example, information about the vehicle operator usable by medical personnel at the scene of a crash. In one example, data storage device 142 may be a button style memory chip as shown in FIG. 3B.

In one example, vehicle connector lockout device 130 may be based on the vehicle connector lockout device described with reference to U.S. Pat. No. 7,553,173, entitled "Vehicle connector lockout apparatus and method of using same," issued on Jun. 30, 2009. The '173 patent describes a vehicle connector lockout apparatus capable of being connected to the diagnostic port of a vehicle. The vehicle connector lockout apparatus uses a raised protrusion, located in the common space below the two rows of pin spacing of the diagnostic port, as a locking point. The vehicle connector lockout apparatus provides a blocking mating connector with a pressure mechanism for clamping the mating connector to the protrusion. The pressure mechanism is activated and released mechanically by operation of a key in a key lock. Further, the vehicle connector lockout apparatus provides a non-volatile microchip memory component to store information about the vehicle operator usable by medical personnel at the scene of a crash.

In another example, vehicle connector lockout device 130 may be based on the vehicle connector lockout device described with reference to U.S. Pat. No. 9,165,131, entitled "Vehicle connector lockout for in-vehicle diagnostic link connector (DLC) interface port," issued on Oct. 20, 2015. The '131 patent describes a vehicle connector lockout that prevents tampering with digital data stored on a vehicle's CAN, that is accessed via the in-vehicle DLC interface port, by verifying in pre-crash, crash and post-crash real time when the DLC is secure and un-secure using NFC technologies embedded in the vehicle connector lockout that is capable of communicating with the Internet.

In a specific example, vehicle connector lockout device 130 may be the AUTOCYB® CYBER LOCK device available from AIRMIKA, INC. (Southern Pines, N.C.).

Referring still to FIG. 1, FIG. 2, and FIG. 3A, another example of a data protection mechanism in vehicle 110 of vehicle data protection system 100 is an NFC label 144. Like NFC lockout tag 140, NFC label 144 may include, for example, an NFC inlay, token, or tag as shown in FIG. 3A. In one example, NFC label 144 is provided on the sun visor of vehicle 110. Like NFC lockout tag 140, NFC label 144 may include, for example, an NFC inlay, token, or tag as shown in FIG. 3A. Other NFC technology may be present in vehicle 110. For example, an NFC card (not shown) may be present in the glove compartment of vehicle 110. Generally, NFC is a short-range wireless connectivity technology that lets NFC-enabled devices communicate with each other. Namely, NFC is a set of communication protocols for communication between two electronic devices over a distance of about 4 cm (about 1.5 in) or less. For example, NFC devices can act as electronic identity documents and keycards. In vehicle data protection system 100, the information stored on NFC lockout tag 140, NFC label 144, and/or the NFC card (not shown) may include, but is not limited to, vehicle information, vehicle owner information, timestamp information, location information, and the like.

In one example, NFC label 144 and/or the NFC card (not shown) may be the NTAG® 424 DNA available from NXP Semiconductors Netherlands B.V. (Netherlands). NFC label 144 and/or the NFC card (not shown) may further include a cryptosecurity protocol for securing access to the cloud database (see FIG. 1), such as those disclosed in U.S. Pat. Nos. 9,031,503 and 9,160,519 and herein incorporated by reference in their entireties. For example, NFC label 144 and/or the NFC card (not shown) may be the NXP 424 NFC DNA CRYPTO tag also available from NXP Semiconductors Netherlands B.V. (Netherlands).

Referring now again to FIG. 1, in vehicle data protection system 100, the counterpart to NFC lockout tag 140 of vehicle connector lockout device 130 and NFC label 144 and/or the NFC card in vehicle 110 may be an NFC reader device 150. NFC reader device 150 may be any NFC-enabled smart device. For example, NFC reader device 150 may be a mobile phone, tablet device, or smart watch that has built in NFC functionality. More specifically, NFC reader device 150 may be, for example, an Apple iPhone, an Apple Watch, or an Android mobile phone with a mobile app loaded thereon, such as an NFC App 152.

In one implementation, when the area of vehicle connector lockout device 130 holding NFC lockout tag 140 is touched or tapped by NFC reader device 150, the time, date and NFC UIP number is captured and logged by NFC App 152. Further, in vehicle data protection system 100, because NFC reader device 150 may be a mobile phone, information from NFC reader device 150 may be communicated to, for example, a cloud server 160 having a cloud database 162 on a via a network 170. Cloud database 162 provides secure key storage. Network 170 may be, for example, a cellular network, a wide area network (WAN), a local area network (LAN), and the like.

In one example, vehicle profiles 164 may be stored at cloud database 162. In one example, NFC App 152 of NFC reader device 150 may be used to transmit the time, date and NFC UIP number from NFC lockout tag 140 of vehicle connector lockout device 130 and/or from NFC label 144 to be stored in a certain vehicle profile 164 at cloud database 162. Accordingly, information in NFC lockout tag 140 and/or NFC label 144 provides the ability for NFC reader device 150 to link vehicle 110 to a vehicle profile 164 at cloud database 162. Further, using this information, a URL landing page may be launched and displayed in a browser at, for example, the sending NFC reader device 150. In another implementation, when vehicle connector lockout device 130 is touched or tapped by NFC reader device 150, the user confirms in real-time the lockout sealed/unsealed status of vehicle connector 120 of vehicle 110 and thereby establishes chain of custody of EDR data 116.

The information loaded on NFC lockout tag 140 of vehicle connector lockout device 130, NFC label 144, and/or NFC card (not shown) may be any useful vehicle and/or vehicle owner information. The information loaded on NFC lockout tag 140 of vehicle connector lockout device 130, NFC label 144, and/or NFC card may be the same or may be different. For example, vehicle identification number (VIN) information, license plate information, vehicle registration information, vehicle insurance information, a vehicle/owner image, vehicle owner medical information, vehicle owner next-of-kin information, and emergency contact information may be loaded on NFC lockout tag 140, NFC label 144, and/or NFC card. This information may also be stored at cloud database 162 and accessed from a corresponding vehicle profile 164.

Referring still to FIG. 1, the presently disclosed vehicle data protection system 100 may include service providers or any other third-party entities that may be associated with vehicle 110 and/or the provider of cloud server 160. For example, vehicle data protection system 100 may include certain service providers 180. Examples of service providers 180 may include, but are not limited to, law enforcement, first responders (EMT, EMS), fire fighters, insurance providers, tow companies, impound facilities, vehicle service providers, and the like. Further, vehicle data protection system 100 may include any other network devices 182 for accessing vehicle 110, cloud server 160, cloud database 162, and/or network 170.

Referring now to FIG. 4 is a schematic diagram of a portion of vehicle data protection system 100 and an example of a method of securing vehicle connector 120 of vehicle 110 and accessing a certain vehicle profile 164 using NFC technology installed vehicle 110. For example, this method may correspond to an after a crash event in which the service provider is an insurance adjuster. The insurance adjuster 205 uses their NFC reader device 150 with NFC App 152 to capture information from NFC lockout tag 140 of vehicle connector lockout device 130, NFC label 144, and/or an NFC card (not shown) in vehicle 110. In this example, vehicle connector lockout device 130 may or may not be installed. If not, the insurance adjuster 205 may be authorized to install vehicle connector lockout device 130 in vehicle 110.

The information from, for example, NFC label 144 may be used to authenticate the insurance adjuster 205 at cloud server 160 and/or cloud database 162, which then directs the insurance adjuster 205 to a corresponding vehicle profile 164 and to a corresponding URL landing page. Insurance adjuster 205 may be associated with an insurance company 210 who may also be granted access to vehicle profile 164 at cloud database 162. Insurance adjuster 205 and insurance company 210 are examples of service providers 180 shown in FIG. 1. Also, in this process the insurance adjuster 205 may confirm in real-time the lockout sealed/unsealed status of vehicle connector 120 of vehicle 110 and thereby establishes chain of custody of EDR data 116.

Further to the example, FIG. 5 shows a schematic diagram of an example of an NFC cycle 300 indicating a method of using the presently disclosed vehicle data protection system 100 to secure access to EDR data 116 of vehicle 110. In this example, an entity or end user may utilize vehicle connector lockout device 130 in combination with NFC label 144, wherein NFC label 144 may be a crash zone security sun visor label having an NFC tag.

Generally, and referring now again to FIG. 1 through FIG. 5, the presently disclosed vehicle data protection system 100 provides NFC technology capable of communicating with the Internet to establish proof of presence thus creating a post-crash consumer protection service to establish the integrity, security, and chain of custody of EDR data 116 of vehicle 110.

Referring still to FIG. 1 through FIG. 5, in the presently disclosed vehicle data protection system 100, a unique in-vehicle security and communications (via NFC Cell/Internet) device is provided that is capable of securing the DLC interface port (e.g., vehicle connector 120) and additionally providing chain-of-custody usage data (e.g., EDR data 116). In one embodiment, an NFC embedded label (e.g., NFC label 144) is placed on the driver's side sun visor of a vehicle (e.g., vehicle 110) that provides information about the Driver Privacy Act of 2015 and the device/service and a signed statement from the vehicle owner granting permission to secure access to the vehicle's DLC interface port.

In some embodiments, the DLC interface port (e.g., vehicle connector 120) is secured using a vehicle connector lockout apparatus (e.g., vehicle connector lockout device 130) capable of being connected to the DLC interface port as shown and described in FIG. 2. Further, the vehicle connector lockout apparatus (e.g., vehicle connector lockout device 130) may include data storage device 142 for storing, for example, information about the vehicle operator usable by medical personnel at the scene of a crash.

In some embodiments, the DLC interface port (e.g., vehicle connector 120) is secured using a vehicle connector lockout (e.g., vehicle connector lockout device 130) adapted to communicate with the Internet as shown and described in FIG. 2 and FIG. 4. For example, vehicle connector lockout device 130 prevents tampering with digital data (e.g., EDR data 116) stored on CAN 112 of vehicle 110, that is accessed via the DLC interface port (e.g., vehicle connector 120), by verifying in pre-crash, crash, and post-crash real time when the DLC interface port is secure and un-secure using NFC lockout tag 140 embedded in vehicle connector lockout device 130 that is capable of communicating with the Internet.

In some embodiments, when the area of vehicle connector lockout device 130 holding NFC lockout tag 140 is touched or tapped by NFC reader device 150, the time, date and NFC UIP number is captured and logged by NFC App 152. Further, in vehicle data protection system 100, because NFC reader device 150 may be a mobile phone, information from NFC reader device 150 may be communicated to, for example, cloud server 160 having cloud database 162. In another implementation, when vehicle connector lockout device 130 is touched or tapped by NFC reader device 150, the user confirms in real-time the lockout sealed/unsealed status of the DLC interface port (e.g., vehicle connector 120), thereby establishing chain of custody of the digital data (e.g., EDR data 116).

In some embodiments, a person uses an NFC enabled cell device (e.g., NFC reader device 150 with NFC App 152) to 'tap' vehicle connector lockout device 130 attached to vehicle connector 120, this 'tap' communicates with the Internet (e.g., cloud server 160, cloud database 162, and/or network 170) via an NFC protocol and opens a landing page where the NFC UID number is collected along with the time and date. The person can add more information, such as insurance information, medical information, next-of-kin information, emergency contacts, and vehicle identification number (VIN). The person then receives a verification via email. The NFC technology may further include a cryptosecurity protocol for securing access to, for example, cloud database 162.

In some embodiments, the end user may use NFC reader device 150 with NFC App 152 to program NFC lockout tag 140 of vehicle connector lockout device 130 and/or NFC label 144 with vehicle data items; for example, vehicle and contact information. Vehicle connector lockout device 130 may be installed into vehicle connector 120 and NFC label 144 may be installed within the vehicle, such as to the sun visor. The end user may be the vehicle owner, another authorized driver or a vehicle service provider. Another example may be where an end user may use NFC reader device 150 with NFC App 152 to program NFC label 144 with one or more vehicle data items. NFC label 144 is then installed onto the vehicle (e.g., a sun visor). The end user may grant permission for an entity (e.g., service providers 180) to install vehicle connector lockout device 130 on vehicle 110 prior to or in the event of a crash; for example, post-crash at a crash site, while vehicle 110 is being transported by a tow-truck, or during impoundment of vehicle 110.

In some embodiments, the method may comprise an end user touching an NFC-designated area of a vehicle connector lockout apparatus (e.g., NFC lockout tag 140 of vehicle connector lockout device 130) with an NFC reader (e.g., NFC reader device 150 with NFC App 152) to display one or more vehicle data items associated with a vehicle profile 164, which in one embodiment may be obtained and viewed using a secure NFC platform. In another embodiment, the data is retrieved from a website URL and viewed on a web browser at, for example, NFC reader device 150 or any other network device 182. The time/date and Universal Identification Number (UID) associated with NFC reader device 150 may be entered in cloud database 162 as part of a vehicle profile 164. Vehicle data items associated with the vehicle profile 164 may also be entered, including a vehicle identification number (VIN), email address, and other contact information. Cloud database 162 may also send email verification upon initial registration of a vehicle profile 164. The user or a service provider 180 (a technician, etc.) may vehicle connector lockout device 130 to vehicle connector 120 and secure it by turning a key of the locking mechanism 134 (see FIG. 2).

Eventually, after a passage of time, the user or another individual (such as a service provider 180) may unlock and remove vehicle connector lockout device 130 during inspection, maintenance, or emissions testing. Then, vehicle connector lockout device 130 may be re-attached to vehicle connector 120 without scanning the NFC designated area of vehicle connector lockout device 130. In the event of a vehicle crash, law enforcement or others may determine whether the vehicle's vehicle connector 120 was locked or unlocked by the vehicle connector lockout device 130; if locked, law enforcement can confirm (e.g., via a cell phone picture) and verify in a police report, if unlocked, law enforcement may decide to secure the vehicle's vehicle connector 120 with a vehicle connector lockout device 130 to maintain security of the data. A data log and certificate of authenticity report associated with the vehicle profile may be generated by cloud database 162 and viewed on, for example, an NFC reader device 150 (e.g., using a secure NFC platform) for use in court proceedings as chain of evidence. Additional embodiments and further details of the methods are shown and described hereinbelow with reference to FIG. 6 through FIG. 10.

In some embodiments, a customer (e.g., vehicle owner) may never install or remove vehicle connector lockout device 130 and may request others, such as auto techs or state emissions inspectors, to install and/or remove vehicle connector lockout device 130. The customer may scan the vehicle connector lockout device 130 using their NFC reader device 150 to be directed to a URL and enter login credentials to access their vehicle profile 164 and determine the status (locked/unlocked) of the vehicle connector lockout device 130.

Referring now to FIG. 6 is a flow diagram of an example of a method 400 of securing a vehicle's EDR data before a crash event using the presently disclosed vehicle data protection system 100. Method 400 may include, but it not limited to, the following steps.

When the NFC is first scanned using an NFC reader device 150, determine whether the vehicle owner is a client 410 registered on a website 412. If the vehicle owner has registered as a client, then the vehicle owner may login to the website 412. If the vehicle owner is not a client, then the vehicle owner may be directed to a registration page on the website 412. The vehicle owner may register as a client and generate a vehicle profile 164 by entering a VIN number of the vehicle to be associated with a vehicle profile 164. Permission to register a vehicle owner as a client and generate a vehicle profile 164 may be provided to a third-party service provider by scanning a NFC label 144 provided by the vehicle owner (for example, via a NFC card).

Once the vehicle profile 164 is verified, a website of vehicle data protection system 100 for purchasing NFC products is launched at step 416. For example, a website for purchasing vehicle connector lockout device 130 with NFC lockout tag 140, NFC label 144, and/or the NFC card (not shown) is launched.

At a step 418, the NFC products purchased in step 416 are shipped to the vehicle owner. For example, the vehicle connector lockout device 130 with NFC lockout tag 140, NFC label 144, and/or the NFC card (not shown) are shipped to the vehicle owner.

At a step 420, the vehicle owner receives the NFC products. For example, the vehicle owner receives the vehicle connector lockout device 130 with NFC lockout tag 140, NFC label 144, and/or the NFC card (not shown).

At a step 422, the vehicle owner installs the NFC products. For example, the vehicle owner installs vehicle connector lockout device 130 with NFC lockout tag 140 onto vehicle connector 120 of his/her vehicle 110, the vehicle owner installs NFC label 144 on the sun visor of his/her vehicle 110, and/or the vehicle owner places the NFC card (not shown) into the glove compartment of his/her vehicle 110.

At a step 424, the vehicle owner registers his/her NFC products. For example, the vehicle owner accesses cloud server 160 and/or cloud database 162 and registers his/her vehicle connector lockout device 130 with NFC lockout tag 140, NFC label 144, and/or the NFC card (not shown). Further, the vehicle owner's vehicle profile 164 is updated. At the completion of step 424, (1) the EDR data 116 of the vehicle owner's vehicle 110 is protected, and (2) the vehicle owner's vehicle 110 is now configured for establishing and maintaining a chain of custody of the EDR data 116.

At a step 426, the vehicle owner or a certain service provider 180 or any other third-party entity touches or taps the NFC lockout tag 140 of vehicle connector lockout device 130, NFC label 144, and/or the NFC card (not shown) using, for example, their NFC reader device 150 with NFC App 152.

At a step 428, NFC App 152 of NFC reader device 150 is used to authenticate the NFC lockout tag 140 of vehicle connector lockout device 130, NFC label 144, and/or the NFC card (not shown). Then, once authenticated, NFC App 152 of NFC reader device 150 is used to capture any useful information from NFC lockout tag 140 of vehicle connector lockout device 130, NFC label 144, and/or the NFC card (not shown).

At a step 430, NFC App 152 of NFC reader device 150 is used to transmit via network 170 any useful information from NFC lockout tag 140 of vehicle connector lockout device 130, NFC label 144, and/or the NFC card (not shown) to cloud server 160 and/or cloud database 162. Further, the vehicle owner's vehicle profile 164 is updated.

At a step 432, upon receiving NFC information, cloud server 160 and/or cloud database 162 automatically generates a notification (e.g., a text message, email, phone call) to the vehicle owner.

At a step 434, upon receiving NFC information, cloud server 160 and/or cloud database 162 automatically generates a notification (e.g., a text message, email, phone call) to the any other interested party, such as any interested service provider 180.

Referring now to FIG. 7 is a flow diagram of an example of a method 500 of securing a vehicle's EDR data during a crash event using the presently disclosed vehicle data protection system 100. Method 500 may include, but it not limited to, the following steps.

At step 510, it is determined whether the vehicle owner is a client 510 with a registered vehicle profile. If the vehicle owner is a client 510, determine whether the driver is the vehicle owner or another motorist driving the vehicle owner's vehicle. If the driver is the vehicle owner or another motorist associated with the client 510, then method 500 proceeds to step 514. At a step 514, the Driver Privacy Act of 2015 is invoked as well as all applicable statutes 516 in the state (e.g., determined via zip code) where the crash occurred. A copy of applicable statutes for event data recorders can be found at https://autotaplock.com/shop/ols/products/edr-state-statutes.

The vehicle 110 may be accessed by authorized service providers 180 or other third-party entities (e.g., law enforcement, first responders (EMT, EMS), fire fighters, insurance providers, tow companies, impound facilities, vehicle service providers) 518. The vehicle owner or a certain service provider 180 or any other third-party entity touches or taps the NFC lockout tag 140 of vehicle connector lockout device 130, NFC label 144, and/or the NFC card (not shown) using, for example, their NFC reader device 150 with NFC App 152.

At a step 522, NFC App 152 of NFC reader device 150 is used to authenticate the NFC lockout tag 140 of vehicle connector lockout device 130, NFC label 144, and/or the NFC card (not shown). Then, once authenticated, NFC App 152 of NFC reader device 150 is used to capture any useful information from NFC lockout tag 140 of vehicle connector lockout device 130, NFC label 144, and/or the NFC card (not shown).

At a step 524, NFC App 152 of NFC reader device 150 is used to transmit via network 170 any useful information from NFC lockout tag 140 of vehicle connector lockout device 130, NFC label 144, and/or the NFC card (not shown) to cloud server 160 and/or cloud database 162. Further, the vehicle owner's vehicle profile 164 is updated.

At a step 526, upon receiving NFC information, cloud server 160 and/or cloud database 162 automatically generates a notification (e.g., a text message, email, phone call) to the vehicle owner.

At a step 528, upon receiving NFC information, cloud server 160 and/or cloud database 162 automatically generates a notification (e.g., a text message, email, phone call) to the any other interested party, such as any interested service provider 180.

Referring now to FIG. 8 is a flow diagram of an example of a method 600 of securing a vehicle's EDR data after a crash event using the presently disclosed vehicle data protection system 100. Method 600 may include, but it not limited to, the following steps.

At step 610, it is determined whether the vehicle owner is a client with a registered vehicle profile. If the vehicle owner is a client, determine at step 612 whether the driver is the vehicle owner or another motorist driving the vehicle owner's vehicle. If the driver is the vehicle owner or another motorist associated with the client, then method 600 proceeds to step 614.

At a step 614, the vehicle 110 may be accessed by authorized service providers 180 or other third-party entities (e.g., law enforcement, first responders (EMT, EMS), fire fighters, insurance providers, tow companies, impound facilities, vehicle service providers). At a step 616, the vehicle owner or a certain service provider 180 or any other third-party entity touches or taps the NFC lockout tag 140 of vehicle connector lockout device 130, NFC label 144, and/or the NFC card (not shown) using, for example, their NFC reader device 150 with NFC App 152.

At a step 618, NFC App 152 of NFC reader device 150 is used to authenticate the NFC lockout tag 140 of vehicle connector lockout device 130, NFC label 144, and/or the NFC card (not shown). Then, once authenticated, NFC App 152 of NFC reader device 150 is used to capture any useful information from NFC lockout tag 140 of vehicle connector lockout device 130, NFC label 144, and/or the NFC card (not shown).

At a step 620, NFC App 152 of NFC reader device 150 is used to transmit via network 170 any useful information from NFC lockout tag 140 of vehicle connector lockout device 130, NFC label 144, and/or the NFC card (not shown) to cloud server 160 and/or cloud database 162. Further, the vehicle owner's vehicle profile 164 is updated.

At a step 622, upon receiving NFC information, cloud server 160 and/or cloud database 162 automatically generates a notification (e.g., a text message, email, phone call) to the vehicle owner.

At a step 624, upon receiving NFC information, cloud server 160 and/or cloud database 162 automatically generates a notification (e.g., a text message, email, phone call) to any authorized service provider 180 or other authorized 3$^{rd}$ party entity.

Referring now to FIG. 9 is a flow diagram of an example of a method 700 of securing access to a vehicle's EDR data using the presently disclosed vehicle data protection system 100. Method 700 may include, but it not limited to, the following steps.

At a step 710, the presently disclosed vehicle data protection system 100 is provided. Namely, vehicle data protection system 100 is provided as described hereinabove with reference to FIG. 1 through FIG. 8 and wherein vehicle data protection system 100 may include an NFC reader device 150 (e.g., any NFC-enabled smart device, such as, but not limited to, a mobile phone (or smartphone), tablet device, smart watch, and the like).

At a step 715, a vehicle connector lockout device is installed onto a diagnostic link connector of a vehicle to prevent unauthorized access to a vehicle's event data recorder data. For example, vehicle connector lockout device 130 is installed onto vehicle connector 120 of vehicle 110 to prevent unauthorized access to EDR data 116.

At a step 720, a label having an NFC tag containing NFC data is provided. For example, vehicle data protection system 100 may include NFC technology, such as NFC lockout tag 140 of vehicle connector lockout device 130, NFC label 144 installed on the sun visor, and/or an NFC card (not shown) in the glove compartment of vehicle 110. NFC lockout tag 140 of vehicle connector lockout device 130, NFC label 144, and/or the NFC card may be programmed with any useful vehicle and/or vehicle owner information, hereafter called NFC data.

At a step 725, NFC data is transferred from the NFC tag to an NFC reader. Namely, NFC data is transferred from the NFC tag to an NFC reader when the NFC reader is in a communication range with the NFC tag. For example, using NFC reader device 150 and NFC App 152, vehicle and/or vehicle owner information may be transferred from NFC lockout tag 140 of vehicle connector lockout device 130, NFC label 144, and/or the NFC card to NFC reader device 150 when NFC reader device 150 is in a communication range with NFC lockout tag 140, NFC label 144, and/or the NFC card.

At a step 730, the NFC reader is directed to a cloud database using the NFC data. For example, based on the contents of the NFC data (e.g., vehicle and/or vehicle owner information of NFC lockout tag 140, NFC label 144, and/or the NFC card) the NFC App 152 of NFC reader device 150 is directed to cloud database 162 at cloud server 160.

At a step 735, the user is prompted for login credentials before displaying one or more vehicle data items to secure access to the vehicle profile. For example, using the NFC App 152 of NFC reader device 150, the user is prompted for login credentials before vehicle data items are displayed at NFC reader device 150 and before allowing secure access to a certain vehicle profile 164.

At a step 740, a time and a date of scanning the NFC label or tag to the cloud database is stored. For example, a timestamp of NFC reader device 150 scanning the NFC lockout tag 140, NFC label 144, and/or the NFC card and linking to cloud database 162 is stored in a certain vehicle profile 164 and/or in the NFC App 152.

At a step 745, a vehicle data profile associated with NFC data and one or more vehicle data items is retrieved from the cloud database. For example, using NFC App 152 of NFC reader device 150, a certain vehicle profile 164 associated with the NFC data and one or more vehicle data items is retrieved from cloud database 162.

At a step 750, one or more vehicle data items associated with vehicle profile is displayed. For example, one or more vehicle data items associated with vehicle profile is displayed at NFC reader device 150 using NFC App 152 that is in secure communication with cloud database 162 at cloud server 160. In one example, NFC App 152 of NFC reader device 150 is directed to a website URL and the one or more vehicle data items are displayed on a web browser at NFC reader device 150. Further, the one or more vehicle data items may be selected from any useful vehicle and/or vehicle owner information, such as, but not limited to, VIN information, license plate information, vehicle registration information, vehicle insurance information, a vehicle/owner image, vehicle owner medical information, vehicle owner next-of-kin information, and emergency contact information.

Referring now to FIG. 10 is a flow diagram of an example of a method 800 of securing access to a vehicle's EDR data and establishing a chain of custody of the vehicle's EDR data using the presently disclosed vehicle data protection system 100. Method 800 may include, but is not limited to, the following steps.

At a step 810, the presently disclosed vehicle data protection system 100 is provided. Namely, vehicle data protection system 100 is provided as described hereinabove with reference to FIG. 1 through FIG. 8 and wherein vehicle data protection system 100 may include a cloud database 162 for storing vehicle profiles 164.

At a step 815, a label having an NFC tag containing NFC data is provided and wherein the NFC data is adapted to redirect an NFC reader to a website connected to the cloud database. For example, vehicle data protection system 100 may include NFC technology, such as NFC lockout tag 140 of vehicle connector lockout device 130, NFC label 144 installed on the sun visor, and/or an NFC card (not shown) in the glove compartment of vehicle 110. NFC lockout tag 140 of vehicle connector lockout device 130, NFC label 144, and/or the NFC card may be programmed with NFC data adapted to redirect, for example, NFC App 152 of NFC reader device 150 to a website connected to cloud database 162.

At a step 820, each NFC label or tag is associated to a vehicle profile on the cloud database. For example, using NFC App 152 of NFC reader device 150, information of the NFC label 144 and/or an NFC card may be associated to a certain vehicle profile 164 at cloud database 162.

At a step 825, a vehicle connector lockout device is installed onto a diagnostic link connector of a vehicle to prevent unauthorized access thereto. For example, vehicle connector lockout device 130 is installed onto vehicle connector 120 of vehicle 110 to prevent unauthorized access to vehicle connector 120. Further, in this step, vehicle connector lockout device 130 may be installed prior to a vehicle crash event occurring. Further, vehicle connector lockout device 130 may be adapted to be unlocked only by the vehicle owner and/or authorized service providers 180. For example, vehicle connector lockout device 130 includes NFC lockout tag 140 containing information with respect to authorized service providers 180.

At a step 830, status updates of the vehicle connector lockout device are provided when the NFC tag is scanned by the NFC reader device. For example, using NFC App 152 of NFC reader device 150, status updates of vehicle connector lockout device 130 are provided when its NFC lockout tag 140 is scanned.

At a step 835, one or more access data is stored when the NFC reader device scans the NFC tag of the label. For example, using NFC App 152 of NFC reader device 150, information is stored at NFC App 152 and/or in a certain vehicle profile 164 at cloud database 162 whenever NFC label 144 and/or the NFC card is scanned.

At a step 840, the cloud database is secured using cryptosecurity protocol. For example, cloud database 162 at cloud server 164 of vehicle data protection system 100 may be secured using cryptosecurity protocol.

In summary and referring now again to FIG. 1 through FIG. 10, the presently disclosed vehicle data protection system 100 and methods 400, 500, 600, 700, and 800 provide means for securing vehicle electronic data. For example, vehicle data protection system 100 and methods 400, 500, 600, 700, and 800 are provided for (1) protecting vehicle digital (or electronic) data, such as the EDR data of a vehicle before, during, and after a crash event, and (2) establishing a chain of custody for vehicle digital (or electronic) data, such as the EDR data.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A method of securing access to a vehicle's event data recorder (EDR) data and establishing a chain of custody comprising:
   installing a vehicle connector lockout apparatus having a lock status on an on-board diagnostics (OBD) connector of a vehicle, the vehicle connector lockout apparatus having
   1) a locking mechanism to prevent or allow access to a vehicle's event data recorder (EDR) data from the OBD connector, wherein access is prevented when the vehicle connector lockout apparatus is locked and access is allowed when the vehicle connector lockout apparatus is unlocked, and
   2) a near field communication (NFC) lockout tag containing one or more NFC data,
   directing a NFC reader to a cloud server using the NFC data when the NFC reader is in a communication range with the NFC tag,
   transferring the lock status and NFC data to a cloud database,
   retrieving a vehicle data profile associated with the NFC data and one or more vehicle data items associated with the vehicle data profile from the cloud database,
   requiring login credentials before displaying one or more vehicle data items on the NFC reader to secure access to the vehicle profile, and
   storing the lock status to the cloud database.

2. The method of claim 1, wherein displaying one or more vehicle data items of the vehicle on the NFC reader comprises displaying the one or more vehicle data item with a software application in secure communications with the cloud database.

3. The method of claim 2, wherein displaying one or more vehicle data items of the vehicle on the NFC reader comprises directing the NFC reader to a website URL and displaying the one or more vehicle data items on a web browser.

4. The method of claim 1, wherein the one or more vehicle data items is selected from the group comprising a vehicle identification number, a license plate data, a vehicle registration data, an insurance data, an image, a vehicle owner's medical data, a vehicle owner's next-of-kin data, and an emergency contact data.

5. The method of claim 1, further including storing a time and a date of scanning the NFC lockout tag to the cloud database.

6. The method of claim 1, wherein the NFC reader is a smartphone.

7. The method of claim 1, wherein the vehicle connector lockout apparatus is installed before a vehicle crash event.

8. The method of claim 1, wherein the vehicle connector lockout apparatus is adapted to be unlocked only by authorized service providers.

9. The method of claim 8 further including providing status updates of the vehicle connector lockout apparatus when the NFC lockout tag of the vehicle connector lockout apparatus is scanned by the NFC reader.

10. The method of claim 1 further including storing one or more access data when the NFC reader scans the NFC tag.

11. The method of claim 10, wherein the one or more access data is selected from the group comprising a date of access, a time of access, a universal identification number associated with the NFC reader, and a geographic location of access.

12. The method of claim 1, wherein the cloud database is secured using a cryptosecurity protocol.

13. The method of claim 1 further including the step of locking the vehicle connector lockout apparatus to prevent access to a vehicle's event data recorder (EDR) data from the OBD connector and transferring the lock status indicating that the OBD data is sealed to the cloud database.

14. The method of claim 1 further including the step of unlocking the vehicle connector lockout apparatus to allow access to a vehicle's event data recorder (EDR) data from the OBD connector and transferring the lock status indicating that the OBD data is unsealed to the cloud database.

15. A method of protecting event data recorder (EDR) data from theft comprising:

providing a motor vehicle diagnostic link connector lockout apparatus with an NFC chip containing an NFC Data Exchange Format (NDEF)-encoded message encrypted with AES-128 bit government-grade cryptography, securing an on-board diagnostics (OBD) connector of the vehicle with the motor vehicle DLC connector lockout apparatus, transferring the NDEF-encoded message to a cloud server when an NFC reader is in communication range of the NFC chip, decrypting the NDEF-encoded message on the cloud server, authenticating a vehicle data profile associated with the NDEF-encoded message, retrieving one or more data items associated with the vehicle data profile from the cloud server, and requiring login credentials before displaying one or more vehicle data items associated with the vehicle data profile on the NFC reader.

16. The method of claim 1, wherein the vehicle connector lockout apparatus is installed after a vehicle crash event.

* * * * *